United States Patent [19]

Hong et al.

[11] Patent Number: 5,160,633
[45] Date of Patent: Nov. 3, 1992

[54] FRONTAL SEPARATOR SYSTEM FOR SEPARATING PARTICLES FROM BEVERAGE LIQUIDS

[75] Inventors: Ing-Tsann Hong; Ernest C. Fitch, both of Stillwater, Okla.

[73] Assignee: The Coca-Cola Company, Atlanta, Ga.

[21] Appl. No.: 533,617

[22] Filed: Jun. 5, 1990

Related U.S. Application Data

[63] Continuation-in-part of Ser. No. 295,329, Jan. 10, 1989, abandoned.

[51] Int. Cl.[5] .......................................... B01D 17/038
[52] U.S. Cl. ...................................... 210/739; 99/495; 99/503; 210/134; 210/360.2; 210/369; 210/380.1; 210/781; 426/330.3; 426/330.5; 426/495; 494/7; 494/36; 494/37
[58] Field of Search ................ 99/302 C, 503, 495; 210/369, 360.1, 360.2, 380.1, 321.68, 321.87, 650, 651, 781, 784, 145, 371, 374, 512.1, 135, 739, 134, 143, 741; 426/330.3–330.5, 487, 490, 495, 478, 599; 494/36, 37, 7, 8

[56] References Cited

U.S. PATENT DOCUMENTS

| | | | |
|---|---|---|---|
| 1,269,067 | 6/1918 | Enell | 210/360.2 |
| 4,119,542 | 10/1978 | Yamaoka et al. | 210/380.1 |
| 4,526,683 | 7/1985 | Walker | 210/360.2 |
| 4,774,097 | 9/1988 | Bushman et al. | 210/781 |

FOREIGN PATENT DOCUMENTS 475933 7/1947 Canada ............................... 426/599

OTHER PUBLICATIONS

"A New Device for Field Recovery of Barite: II. Scale-Up and Design", Burdyn et al., Paper presented at SPE-U of Texas Conf. on Drilling and Rock Mechanics, Austin, Tex., Jan. 20, 1965.
Japanese Kokai Patent Publication No. 53-115,660, Oct. 9, 1978, Takadone et al.
Laid-Open Patent Publication No. 18971/1982 Opened Jan. 30, 1982, Fukutani et al.

Primary Examiner—Robert A. Dawson
Assistant Examiner—Joseph Drodge
Attorney, Agent, or Firm—Thomas R. Boston; W. Dexter Brooks

[57] ABSTRACT

A frontal separator method and apparatus for separating particles from fluids, such as microorganisms from juice, and for providing a sample of juice having a concentrated number of microorganisms therein for ease of detection thereof, comprising a hollow, rotatable, perforated, cylindrical rotor mounted inside of a spaced-apart outer case with an annular separation chamber therebetween. The fluid with particles to be separated therefrom is fed into the separation chamber, the fluid flows through the holes in the rotor and exits through an outlet port while the particles exit from a waste port of the separation chamber. The outer casing preferably also rotates with the rotor, and the holes, which have a diameter substantially greater than that of the particles, are preferably at an angle to a radius of the rotor.

26 Claims, 8 Drawing Sheets

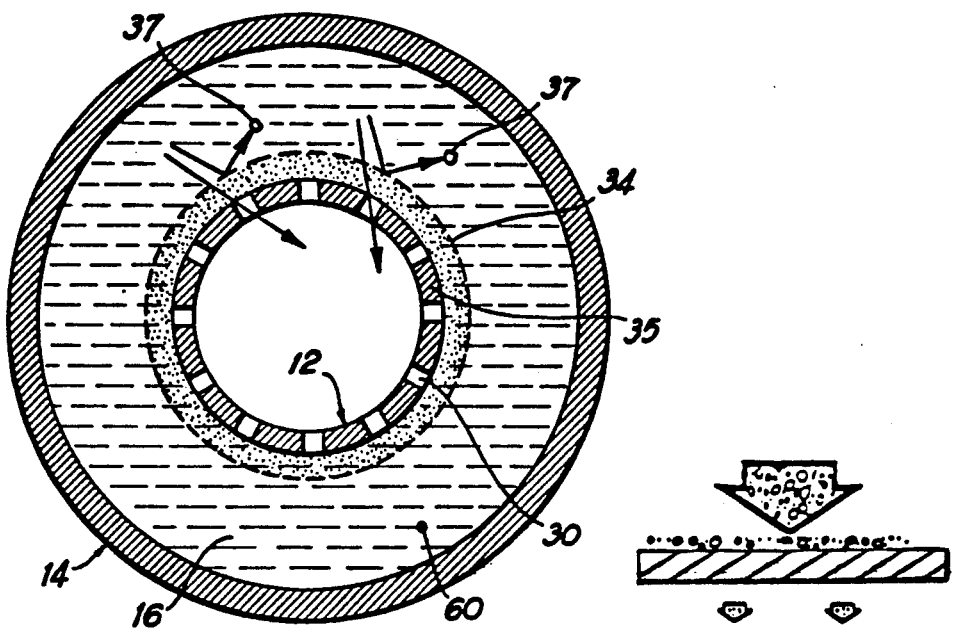
FIG 3
FIG 4A
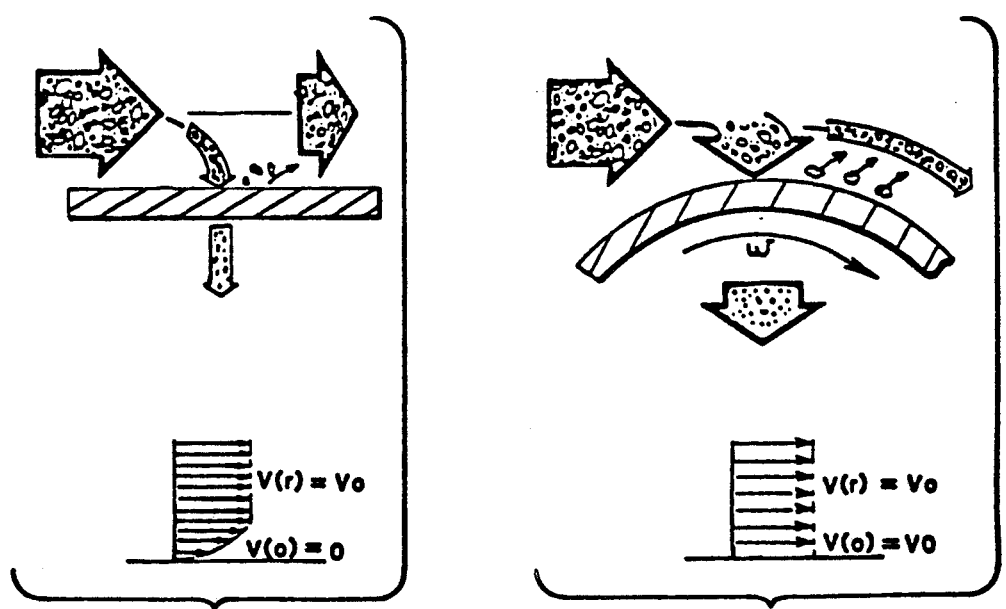
FIG 4B
FIG 4C

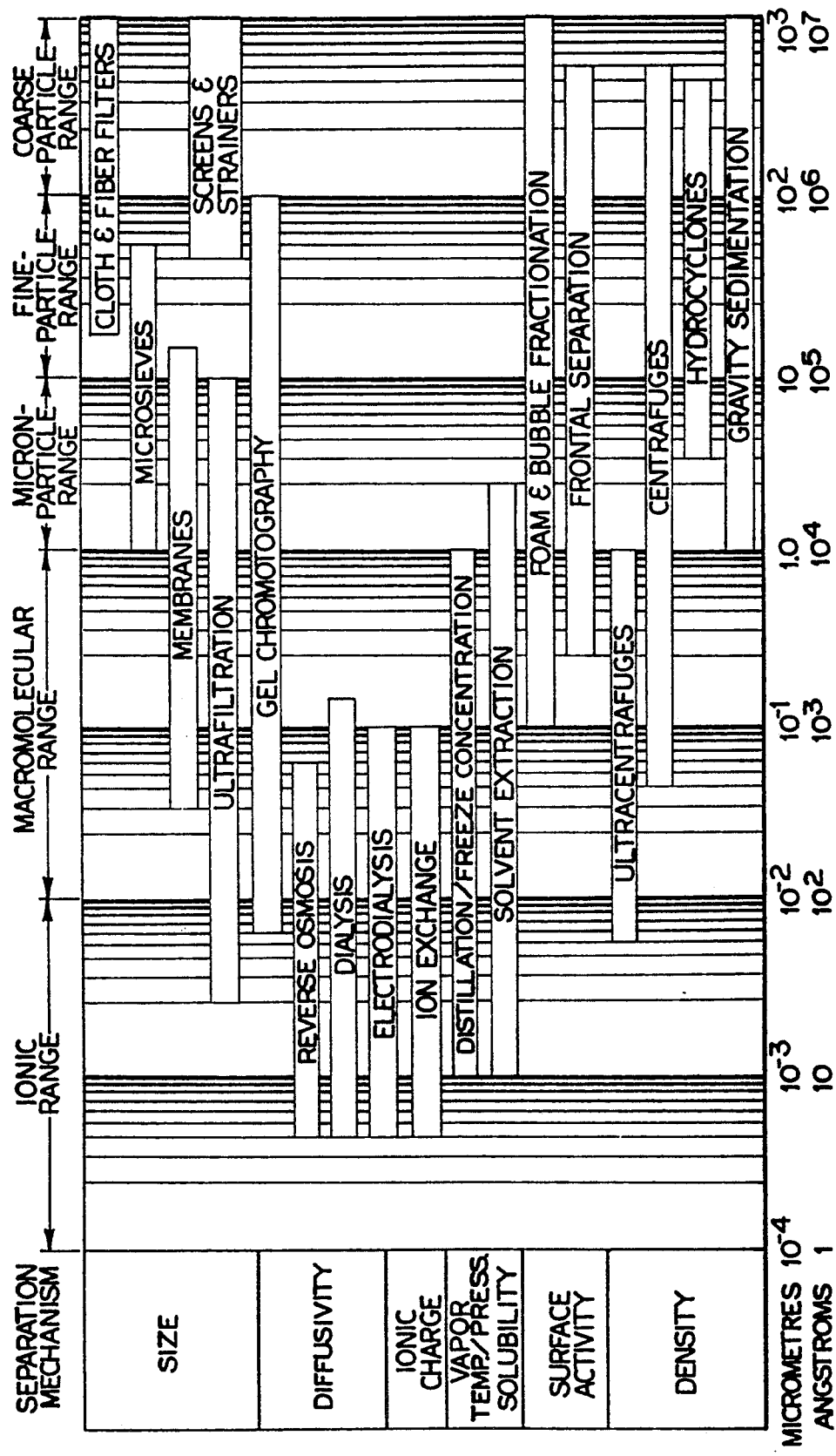

FRONTAL SEPARATOR SYSTEM FOR SEPARATING PARTICLES FROM BEVERAGE LIQUIDS

CROSS-REFERENCE TO RELATED APPLICATION

This is a continuation-in-part of copending application Ser. No. 07/295,329 filed Jan. 10, 1989 and now abandoned and having the same title, inventors and assignee as the present application.

BACKGROUND OF THE INVENTION

This invention relates to the separation of particles from beverage liquids, and in one embodiment to concentrating microorganisms (such as yeast and bacteria) in a sample of orange juice for sterility testing purposes, and in another embodiment to removing microorganisms, including for example, bacteria, any other particles from beverage liquids to eliminate the need for pasteurization.

In the past, the separation of particles from liquids has been accomplished by inertial separation methods or by some form of filtration. In the case of inertial separators, separation performance depends on the difference between the centrifugal and drag forces that act on the challenged particles. For such separators, the operator has little or no control over the separation process. In the case of filtration, separation is achieved by fluid passing through a semi-permeable medium capable of retaining on the medium, particles larger than the pore size of the medium.

Regardless of whether inertial separation or filtration is selected, the process becomes impractical as the particle size decreases and as the difference in density between the fluid and the particles decreases. Low density difference between particle and fluid eliminates inertial separators from contention, and particle sizes approaching that of the pore size of the medium cause serious loss of filter capacity.

In filtration, fluids can flow through filter media in two ways—normally or tangentially. In normal flow (see FIG. 4A), fluid passes perpendicular to the surface of the media, whereas in tangential flow (also know as cross flow—see FIG. 4B) fluid passes essentially parallel to the filter surface.

In many critical applications, normal flow filtration is completely useless, because the particles not passing through the filter medium remain close to or on top of the upstream surface of the medium. These particles form a layer that severely limits and eventually stops the fluid flow. In tangential flow filtration, on the other hand, the process flow moves tangentially to the filter surface, and it is hoped that the retained particles get swept along with the flow. As a result, a higher through-put is expected. Nevertheless, a "dead zone" forms adjacent to the static surface when fluid flows tangentially to it. At this dead zone the flow rate is zero, which results in particle stagnation. This pitfall renders tangential flow filtration unsuitable on industrial process equipment and limits it to laboratory use.

Two articles describing prior art devices are:

1. Burdyn, R. R., D E. Hawk & F. D. Patchen, "A New Device for Field Recovery of Barite: II Scale-Up and Design " Society of Petroleum Engineering Journal, June, 1965, and 2. Margaritis, A. and C. R. Wilke, "Engineering Analysis of the Rotorfermentor," Work performed under the auspices of the U.S. Atomic Energy Commission, University of California, Berkeley, 1970.

SUMMARY OF THE INVENTION

A frontal separator method and apparatus for separating particles from liquids, such as microorganisms from beverage liquids. In a preferred embodiment the frontal separator comprises a hollow, rotatable, perforated, cylindrical rotor inside of a hollow, rotatable, imperforate case and separated therefrom by an annular separation chamber for the liquid. The rotor encloses an outlet chamber for the clarified liquid. A liquid inlet port communicates with one end of the separation chamber, a concentrated liquid outlet port (or waste port) communicates with the other end of the separation chamber, and a clarified liquid outlet port communicates with the outlet chamber. The openings in the perforated cylinder have a cross-sectional area substantially greater than the diameter of the particles, and are preferably, although not necessarily, at an angle to a radius of the rotor.

In another embodiment, the outer case is stationary and the rotor openings are at an angle to a radius of the rotor.

It is an object of the present invention to provide a frontal separator system for separating particles from beverage liquids.

It is a further object of this invention to provide a system for concentrating microorganisms in a sample of a beverage liquid for sterility testing purposes.

It is another object of this invention to separate bacteria from beverage liquids to avoid the need for pasteurization and to avoid the effects thereof on the flavor or taste of the beverage.

It is another object of this invention to provide a frontal separator system for separating particles having a size in the range of from about 0.5 to 500 micrometers, and in a preferred embodiment of from about 1 to 10 micrometers, from a liquid in which the difference in density between the particles and the liquid is very small.

BRIEF DESCRIPTION OF THE DRAWINGS

The present invention will be more fully understood from the detailed description below when read in connection with the accompanying drawings wherein like reference numerals refer to like elements and wherein:

FIG. 3 is a cross-sectional view, taken along line 3—3 of FIG. 1, of a frontal separator illustrating a frontal flow separation process;

FIG. 4A is a diagrammatic view illustrating normal filtration;

FIG. 4B is a diagrammatic view illustrating tangential or cross flow filtration;

FIG. 4C is a diagrammatic view illustrating frontal separation;

FIG. 12 is a table showing the various known techniques used to separate liquids from solids or other liquids.

DETAILED DESCRIPTION OF THE PREFERRED EMBODIMENTS

Figures 1, 2:
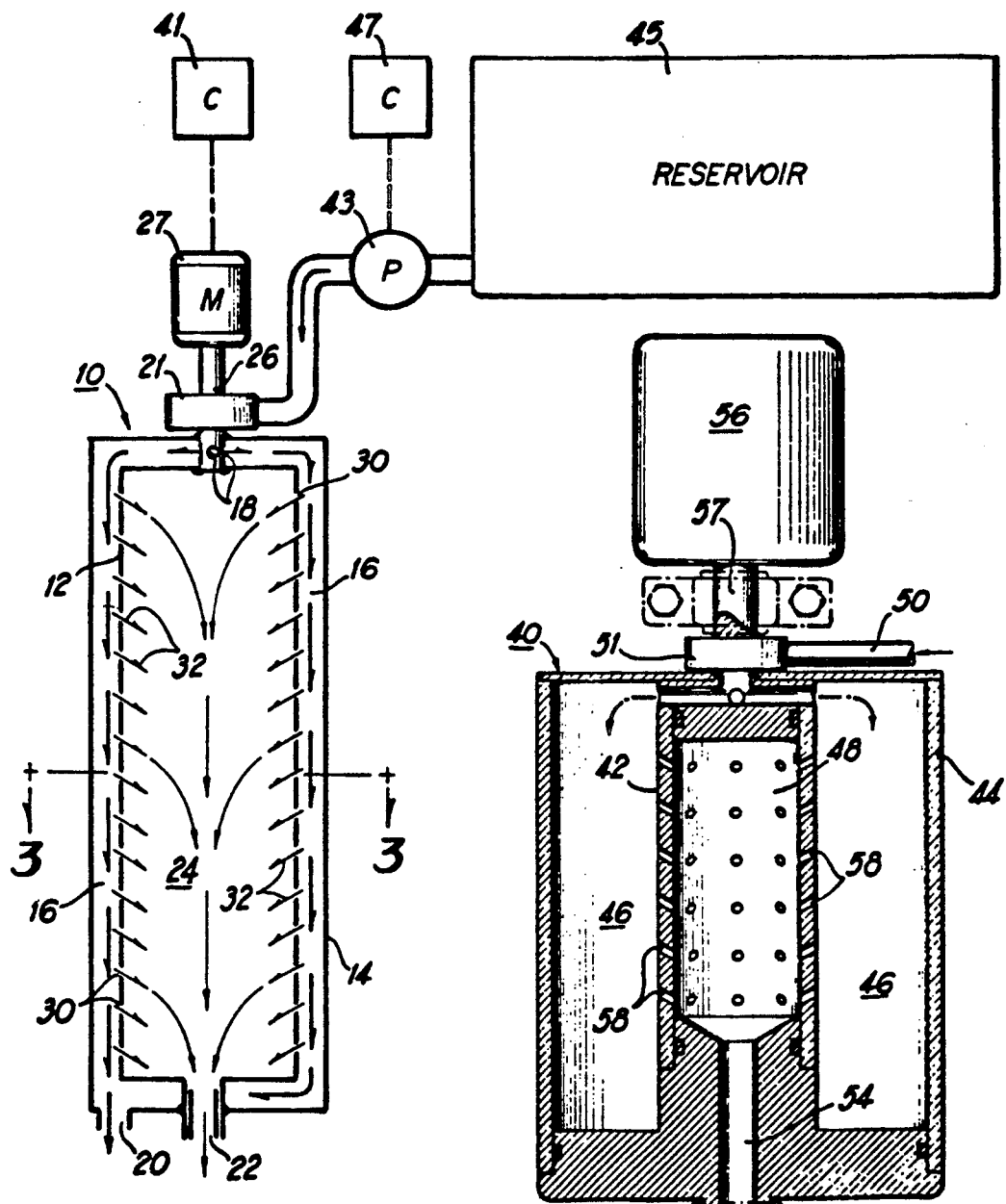
FIG. 1 is a diagrammatic, cross-sectional view through a preferred embodiment of a frontal separator according to the present invention.
FIG. 2 is a cross-sectional view through another embodiment of a frontal separator of the present invention.

With reference now to the drawings, FIG. 1 is a diagrammatic view of a preferred embodiment of a frontal separator 10 of the present invention. The frontal separator 10 includes an inner, hollow, rotatable, perforated, cylindrical rotor 12 mounted inside of a spaced-apart, outer, imperforate, hollow, rotatable, cylindrical case 14 to provide an annular separation chamber 16 therebetween having an inlet port 18 and a waste port or outlet port 20 communicating therewith. A fluid delivery collar 21 is associated with the inlet port, as will be understood by those skilled in the art. The rotor 12 encloses an outlet chamber 24 for the clarified liquid, and an outlet port 22 communicates with the outlet chamber 24. A drive shaft 26 is connected to a motor 27 and to the rotor and casing. A controller 41 is connected to the motor to control the rotational speed of the rotor and casing. A pump 43 feeds liquid from a reservoir 45 to the inlet port 18. A controller 47 is connected to the pump 43 to control the flow rate of the liquid through the separator 10.

The rotor 12 is provided with openings 30 which are substantially greater in diameter than are the diameters of the particles to be separated. The openings 30 are preferably inclined at an angle to a radius of the rotor 12 as indicated by the arrows 32 showing the liquid flow of, for example, orange juice from the inlet port 18, to the separation chamber 16, through the openings 30 in the rotor 12, and then through the outlet port 22. The microorganisms cannot flow through the openings in the rotor 12 for the reasons to be explained below, and thus the orange juice fed out the outlet port 20 has a higher concentration of the microorganisms than does the orange juice fed into the inlet port 18.

This is the preferred embodiment, in which the outer case 14 rotates with the rotor 12. The openings 30 in the rotor 12 can be normal to the rotor surface or at an angle to the normal (that is, at an angle to a radius of the rotor). In another embodiment (see FIG. 10), the outer case is stationary but the openings 30 are angled. The openings 30 are preferably located on the rotor in a regular array. The openings 30 can be of any cross-sectional shape. When angled openings are used, it is not essential that they be straight.

FIG. 2 is a cross-sectional view through a frontal separator 40 according to this invention. The frontal separator 40 includes an inner, perforated, cylindrical rotor 42, an outer case 44 fixed to rotate with the rotor, a separation chamber 46, a clarified liquid outlet chamber 48, an inlet line 50 and a fluid delivery collar 51 at one end of the separation chamber, and an outlet port 54 communicating with the outlet chamber 48. A motor 56 drives the frontal separator 40 through a shaft 57 and suitable bearings as is well-known to those skilled in the art. The rotor includes openings 58 therethrough which may be for either normal or tangential flow.

The frontal separator system of this invention takes advantage of desirable features of both inertial separators and filters by synergizing their respective characteristics to achieve a performance heretofore unattained in practice. The frontal separator uses rotation to artificially generate a sub-permeable gravitational force, or wave front 34 (see FIG. 3) adjacent to the outer surface of the rotor (12 or 42). This front, an extremely thin gravitational force field surrounding the rotor (12 or 42), allows the liquid 60 to penetrate it but rejects certain particles 37 (namely, those of the size and density to be removed from the liquid).

The mechanism employed by the frontal separator is altogether different from that used by a centrifugal separator, which requires a complete or fully developed artificial gravitational force field to achieve particle separation. In the frontal separator system, the wave front 34 acts just like the media of a filter that rejects particles of a certain size at the upstream porous surface (analogous to the front) but allows fluid to pass through it. However, the front 34 differs from such a known porous surface in that the artificial gravitational force ejects the particles 37 away from the rotating surface. Such particles 37 will not be retained or allowed to build up on the separating surface of the rotor (12 or 42).

Figure 5:
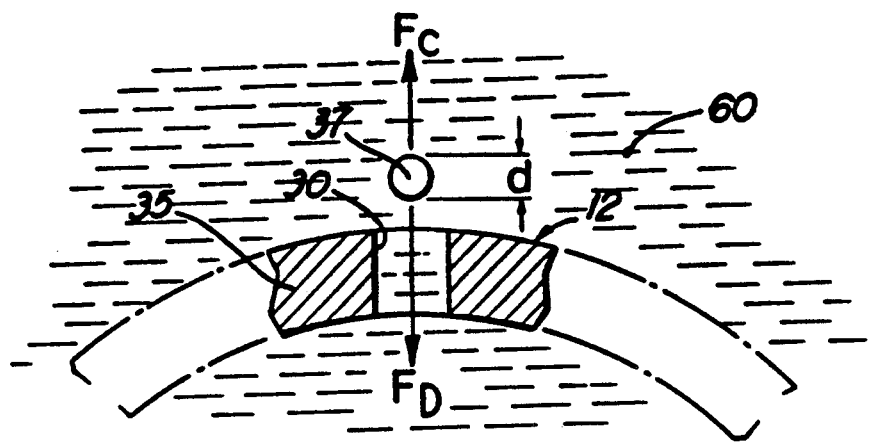
FIG. 5 is a diagrammatic view illustrating a normal frontal separation process.

The frontal separator essentially consists of a hollow rotating mechanism (the rotor), the surface of which has two portions—a solid wall portion 35 and the openings 30. When the rotor rotates, it creates an artificial orbital force field in the adjacent portion of the liquid in the separation chamber; this field then establishes a material rejection front in which particle penetration energy is attenuated. FIG. 5 shows the forces acting on a particle 37 in the separation chamber. These forces consist of a centrifugal force $F_c$ induced by the rotating surface, and the drag force $F_D$ created by the viscous friction of the liquid 60 on the particle 37. Separation occurs when the force balance on the particle is such that the centrifugal force exerted on the particle (having a size equal to or larger than a particular size) equals or exceeds the drag force. In the normal flow rotary separator (NRS), the effluent fluid is driven radially through the openings 30 in the rotor 12. When this normal flow exists, the drag force on the particle is maximum. As a result, a dramatically high centrifugal force is required to overcome this "normal" drag force on the particle; thus, the effluent flow rate must be limited in order to obtain a given separation efficiency.

Figure 6:
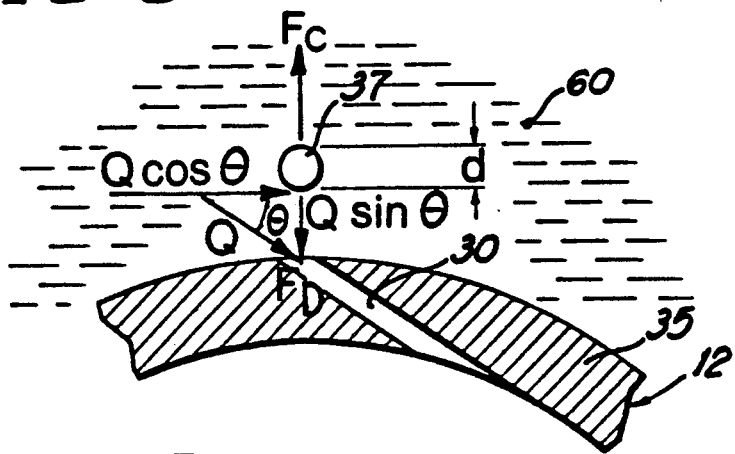
FIG. 6 is a diagrammatic view illustrating a tangential frontal separation process.

The tangential frontal separator (TFS), differs from the known normal flow separator (NRS) which has a stationary outer case 14 in that the TFS has a tangential porting configuration for the openings 30 in the rotor 12 instead of normal porting. The concept of the TFS is depicted in FIG. 6. The TFS port can incline in any direction with respect to the rotating surface of the rotor 12, thus reducing the drag force exerted on the particle by the effluent flow rate (namely, the radial particle velocity component). A TFS can thus achieve the same separation performance as an NRS can, but with a flow rate many times greater. For example, a tangential port having an inclination of 30 degrees to the rotating surface would produce twice the flow of an NRS, with all other conditions remaining the same. Theoretically, a zero degree inclined port can process an infinite amount of flow.

Figure 7:
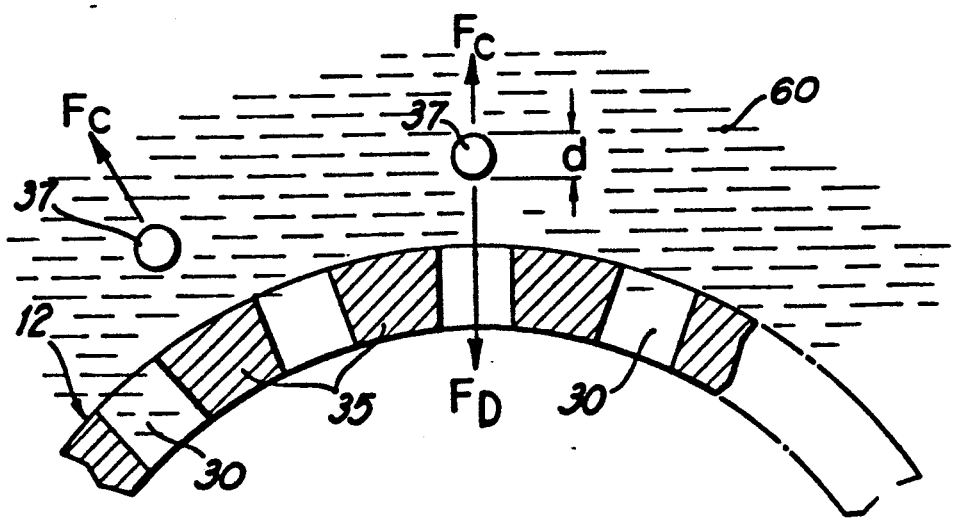
FIG. 7 is a diagrammatic view illustrating the "golfing effect" or "golfing enhanced separation" of the present invention.

Another aspect of this invention is a golfing-enhanced separation process, as illustrated in FIG. 7. As shown, the rotatable perforated rotor 12 of the frontal separator 10 consists of a solid portion 35 (ribs) and a regular array of holes or flow openings 30. Physically, when particles 37 are opposite the solid section they will experience only the outward (from the rotating center) centrifugal force and when so located, any particles having a specific gravity greater than that of the liquid 60 will be accelerated away from the rotor. However, particles traveling across the openings 30 experience both the outward and the inward (radial effluent flow) forces. In theory, a particle can be separated if it can be accelerated and moved outward into the separation chamber 16 far enough away from the rotor 12 while it travels opposite the solid portion 35 of the rotor 12. In other words, if the particle reaches a position in the separation chamber 16 such that when it is opposite an opening 30, the radial flow force cannot drag it back to the rotating surface, then the particle 37 is separated—an action analogous to putting a golf ball so fast that it carries across the hole on a green rather than dropping into the hole and hence referred to as the "golfing effect." This frontal separation process can be fully described mathematically, showing for example, that if the rib-to-hole ratio of the rotor 12 is set at its optimum ratio for a square port configuration, then the flow rate for an optimized golfing-enhanced separator will be increased 20.7% over that of a nonoptimized golfing separator having a rib to hole ratio of one.

Still another feature of this invention concerns the power to drive the frontal separator. The drag friction force between the liquid and the associated boundaries, as well as the inertial momentum of the rotor 12, constitute two major resistances that influence the amount of power required to drive the frontal separator. The frontal separator of this invention that uses an outer casing that rotates with the inner rotor can dramatically reduce this separator power requirement. FIG. 1 shows such a frontal separator. In operation, the rotor 12 and the case 14 are connected and rotate together; namely, they have identical angular velocities. Therefore, the relative velocity between the boundary and the adjacent fluid is theoretically zero. In other words, no drag friction force exists between the fluid and the boundaries; the only power required to drive the separation process is that needed to overcome both the angular momentum of rotors and the friction imposed on the separator's outer case (simply a solid surface moving against air only), this friction being several orders of magnitude smaller than when the boundary moves relative to a viscous fluid.

Summarizing the above description, the frontal separator includes a cylindrical rotor (or inner boundary) that produces a centrifugal force field within the separation chamber. The outer boundary of the separation chamber may have the same rotational speed as the rotor 12 or it may exhibit a relative rotational velocity with respect to the rotor. The frictional drag generated by the drive system and the inner boundary causes the liquid next to the surface of the rotor to rotate.

The liquid containing the particles to be separated is pumped to the inlet port to flow into the separation chamber. Although the preferred embodiment has been described above with reference to a liquid, the suspension or contaminant may be a gas, a liquid or a solid. Because the suspended particles are more dense than the fluid, then the artificial gravity created by the rotating fluid acts on these particles and causes them to move away from the surface of the rotor. The clean fluid will exit through the holes in the rotor and out the outlet port of the outlet chamber, while the concentrated contaminated fluid exits from the waste port of the separation chamber.

The flow rate plays an important role in determining the size of the particles the separator removes. The lower the flow rate, the smaller the size particle that can be separated. This situation occurs because the fluid passing through the holes in the rotor tends to drag and transport suspended particles with it. Consequently, flow rate is a critical parameter in designing and operating such a separator.

FRONTAL SEPARATION THEORY

FIG. 12 shows various known techniques used to separate liquids from solids or other liquids. These techniques are all based on the range of particle-size effectiveness and other primary factors affecting separation. In the present invention, sizes of particles such as microorganisms in the range of from about 0.5 to 500 micrometers are involved. In this range, the solid/fluid separation is most effective when applying the properties of size, density, or surface activity. In one of the preferred embodiments namely that of citrus clarification, using the properties of size and density for separation is more attractive than using that of surface activity in the actual process. Therefore, the preferred embodiment focuses only on the effects of size and density on separation.

Solids can be separated from fluids with the aid of a semi-permeable medium that retains solids larger than the pore size of the medium but allows the liquids to pass through. This process is usually defined as filtration. There are two ways fluids can flow through media: normally and tangentially. In the normal flow, the fluid passes perpendicular to the surface of the media, while, in the tangential (or cross flow), fluid essentially passes parallel to the filter surface, see FIGS. 4A and 4B.

In microorganism separation, normal flow filtration is completely useless, because the material not passing through the filter remains close to or on top of the upstream surface of the filter. This material forms a layer that severely limits and eventually stops the fluid flow. On the other hand, in the tangential flow filtration, the process flow moves tangentially to the filter surface so the retained material is "intuitively" swept along with the flow. As a result, a higher through-put can be obtained. Many researchers have recommended and applied tangential filtration to separate microorganisms from fluid. Nevertheless, most of these researchers have overlooked the fluid property near the filter surface. Theoretically, there is a "dead-zone" adjacent to the static surface when fluid flows parallel to it. At the dead-zone, the flow rate is zero, which results in particle stagnation. In other words, particles are still retained on the filter surface although the bulk flow moves parallel to it. Users have frequently reported this pitfall. This factor might be the reason that tangential filtration has always been used as a laboratory device rather than as industrial process equipment.

Particles can also be separated from a fluid by gravitational force, either natural or artificial. To achieve micron-size separation, high artificial gravitation is required. This artificial gravitation can be generated either by mechanical action (centrifugal) or by the kinetic energy possessed by the fluid (cyclonic). However, these two separation techniques (centrifugal and cyclonic) have a commonality—they "throw away" solids from the rotational center to the collecting boundary, which normally is a considerable distance from the center as compared to the size of the solids' for example, 1 inch to 2 micrometers (0.0000787 inches). As a result, the residence time of separation is very long. For instance, to separate microorganisms (2-μm) from citrus juice (density difference is approximately 0.037 gm/cc) from a 4-inch diameter rotor to a 5-inch diameter boundary at 5000 rpm (around 1500 g), the residence time of separation is 347 sec. In other words, it takes approximately 6 minutes for a 2-μm particle to travel from the rotor to the boundary, a distance of 0.5 inches. In addition, this calculation is based on the assumption that the centrifugal field is uniformly distributed from the rotor to the boundary. In practice, the field has a maximum centrifugal force adjacent to the rotor surface which decreases to zero at the boundary. Therefore, the solids may not reach the boundary. Furthermore, any disturbance of the fluid pattern will destroy the separation mechanism and significantly reduce the separation efficiency. Consequently, using a centrifuge or a cyclone to separate microorganisms from fluid with an insignificant density difference is impractical.

The frontal separation system of this invention adapts both the advantages of a filter and a centrifuge and synergizes them to achieve separation. It uses rotation to artificially generate a sub-permeable gravitational force front adjacent to the rotor surface. This front allows fluid to "break" through, but rejects particles of a designated size. The wave front acts just like a filter that retains particles of a certain size at the upstream membrane surface (analogous to the front) and allows fluid to pass through it. However, the front is different from the membrane in that the artificial gravitational force will "push" particles away from the rotating surface. Such particles will not be captured or caked on the separating surface.

A frontal separator includes a hollow rotor in a closed vessel. The surface of the rotor has two portions: a solid portion and holes. When the rotor rotates, it creates an artificial orbital field in the liquid which establishes a material rejection front in which material penetration energy is attenuated. The force balance equations which describe the frontal force (the centrifugal force adjacent to the rotating surface) and the drag forces imposed on the particle are:

$$F_c = \frac{\pi}{6} d^3 (\sigma - \rho) \frac{V^2}{r} \tag{1}$$

$$F_D = 3\pi \eta d u \tag{2}$$

where
$F_c$ = centrifugal force or solid particle of size d
$F_D$ = drag force on solid particle of size d
d = particle size
σ = particle specific gravity
ρ = fluid specific gravity
V = tangential velocity
r = radius of rotation
η = fluid viscosity
u = radial velocity Separation occurs when the centrifugal force exerted on a particle, having a size equal to or larger than the designated size, is greater than the drag force, see FIG. 5. Therefore, the critical size of a particle being propelled from the rotating surface is:

$$d = \left[ \frac{18 \eta u R}{(\sigma - \rho) V^2} \right]^{\frac{1}{2}} \tag{3}$$

where
R = radius of rotor

Further, $$V = \omega R \tag{4}$$

$$u = \frac{Q}{2\pi R L O} \tag{5}$$

$$\omega = 2\pi N \tag{6}$$

where
ω = angular velocity
Q = radial flow rate
L = length of rotor
O = hole porosity Hence, $$d = \frac{3}{2\pi R N} \left[ \frac{1}{\pi} \frac{\eta Q}{L O (\sigma - \rho)} \right]^{\frac{1}{2}} \tag{7}$$

Equation (7) describes the separation characteristic of a frontal separator.

In 1965, Burdyn, Hawk, and Patchen reported that they obtained a 92 percent separation of barite of 2.89 micrometers from fluid (viscosity, 3.1 cp and specific gravity difference of 3.05) at 10 gpm using an equation similar to Eq. (7). In early 1970, Margaritis and Wilke also reported that they developed a rotorfermentor which could separate polystyrene spheres (specific gravity 1.053) of size range 6 to 14 μm at a filtration rate of 0.691 gpm per square foot and rotation speed of 2500 rpm.

A thorough literature survey showed that every researcher uses Eq. (7) to separate solids and fluids. This equation represents the process by which the effluent fluid is driven normally through the porous holes. At such a condition, the drag force is maximum. As a result, a dramatically high centrifugal force is required to overcome the normal drag force; thus, the effluent flow rate is limited. This might be the reason why most people use Eq. (7) to develop a "concentrator" rather than a separator and why they always required a feedback flow to circulate fluid multiple times through the concentrator. In addition, there has been no criterion for sizing the characteristic (solid portion/hole ratio) of the porous material (screen) of the rotor.

In the present invention, a tangential frontal separator (TFS) concept was introduced for the first time. Different from the ordinary normal frontal separator (NFS), the TFS has tangential porting to form the holes in the rotor. In addition, it adopts the "golfing effect," which allows the designer to determine the hole to rib (solid part) ratio to optimize the separation condition.

FIG. 6 depicts the concept of tangential frontal separation. The port or hole 30 inclines to the rotating surface with an angle, $\theta$. As a result, the drag force exerted on the particle with an effluent flow rate Q (namely, vertical particle velocity u) becomes $$F_D = 3\pi\eta du \sin\theta \quad (8)$$

Hence, for a tangential frontal separator, the separation characteristic equation (Eq. (7)) can be rewritten as $$d = \frac{3}{2\pi RN} \cdot \frac{1}{\pi} \cdot \frac{\eta(Q\sin\theta)}{LO(\sigma - P)}^{\frac{1}{2}} \quad (9)$$

In other words, a TFS can achieve the identical separation as an ordinary normal frontal separator with a flow rate of $(1/\sin\theta)$ times higher. For example, a tangential port having an inclination of 30 degrees can process 2 times $(1/\sin 30° = 2)$ the flow that an NFS does. Theoretically, a zero degree port can process an infinite amount of flow.

FIG. 7 shows the golfing-enhanced separation process. As shown, the rotor surface of a frontal separation consists of a solid portion (rib) and a porous portion (hole or opening 30). Physically, particles only experience the outward (from the rotating center) centrifugal force at the solid section. Any particles having a specific gravity greater than the fluid will be accelerated away from the surface of the rotor 12 in the solid portion 35. However, particles travelling across the openings 30 experience both the outward and inward (radial effluent flow force) forces. In theory, if a particle can be accelerated and moved to a certain location away from the rotating surface as it travels along the solid portion 35, and if the position is high enough above the surface that the radial flow force in the porous section (the openings 30) will not be sufficient to bring it back to the rotating surface before the particle completes its motion along the porous part; then the particle can be separated. This process can be mathematically described as follows:

Assume that holes with the same size are uniformly distributed on the rotor's surface. The solid length is $l_s$ and the rectangular hole size is $l_x$. Then, the particle will be forced away from the solid surface having a distance of $$Y_{ps} = (V_e - V_r) \cdot t_s \quad (10)$$

where
  $Y_{ps}$ = distance of particle propelled away from the solid particle in time ts
  $V_e$ = particle escape velocity
  $V_r$ = particle inward radial velocity
  $t_s$ = time elapse particle required to travel along the solid portion,
Rearranging Eqs. (1), (2) and (4) gives $$V_e = \frac{Rd^2\omega^2}{18\eta} \Delta\rho \quad (11)$$

where $\Delta\rho = (\sigma - \rho)$, specific gravity difference.
$V_r$ is zero in the solid section.

Similarly, the particle motion characteristic in the porous portion is described as $$Y_{pp} = (V_r - V_e) \cdot t_p \quad (12)$$

where
  $Y_{pp}$ = the distance the particle travels toward the rotating center during the porous section
  $t_p$ = the time required for the particle to travel along the porous section and in the porous section, $$Y_r = \frac{Q}{A_r \cdot O} \quad (13)$$

where
  $A_r = 2\pi RL$, rotor's surface area
  $O$ = porosity
For a rectangular configuration, the porosity is $$O = \frac{1}{1 + l_{sh2}} \quad (14)$$

where $$l_{sh} = \frac{l_s}{l_h}, \text{rib-hole ratio} \quad (15)$$

Therefore, the golfing effect is valid if $$Y_{ps} \geq Y_{pp} \quad (16)$$

or $$(1 + l_{sh}) \geq A \cdot (1 + l_{sh}^2) \quad (17)$$

where $$A = \frac{9\eta Q}{\pi d^2 \omega^2 R^2 L \Delta\rho} \quad (18)$$

Hence, the minimum rib-hole ratio (lsh) to obtain golfing effect is $$l_{sh} = \frac{1 + \sqrt{1 - 4A(A - 1)}}{2A} \quad (19)$$

To find the ratio that gives the maximum flow rate (A is maximum), Eq. (17) needs to be rearranged, derived with respect to the lsh, and set to zero, giving $$\frac{\partial A}{\partial l_{sh}} = \frac{l_{sh}^2 + 2l_{sh} - 1}{(1 + l_{sh}^2)^2} = 0 \quad (20)$$

Namely, $$l_{sh} = 0.414 \quad (21)$$

Substituting Eq. 21 into Eq. 19 and solving for A gives $$A = 1.207 \quad (22)$$

Figure 8:
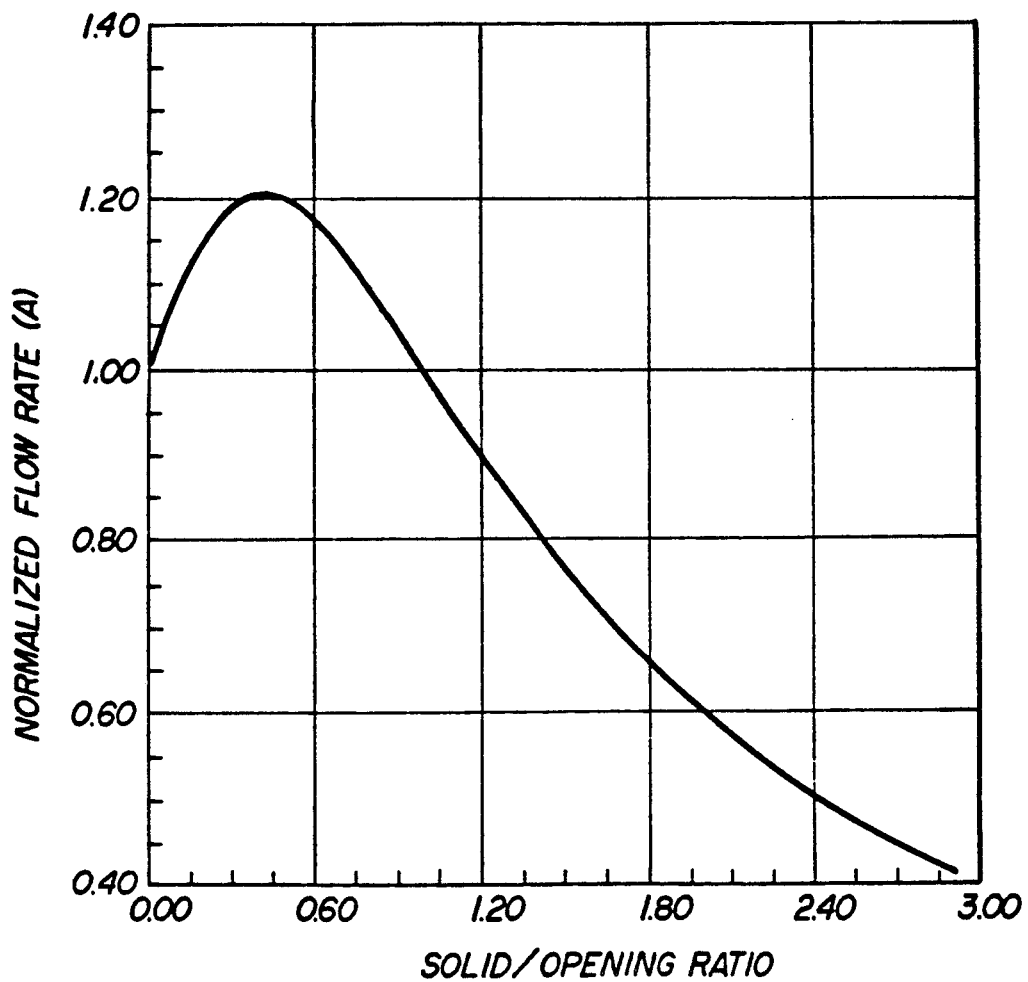
FIG. 8 is a graph illustrating golfing effect characteristics.

In other words, if the rib-hole ratio is set at its optimum ratio, then the flow rate increases 20.7% or more for an optimized golfing-enhanced separator than for a non-optimized golfing separator, see FIG. 8. Therefore, combining tangential porting and optimized golfing in one design increases the process flow rate $1.207/\sin\theta$ times or more than that of a normal frontal separator.

FRONTAL SEPARATOR DESIGN

Design Criteria

Two prototype frontal separators were fabricated based on Eq. (9). A first prototype FC-1 operated on the normal frontal separator principle, which uses a normal effluent flow pattern. Table 1 shows the design data for this separator. As this table shows, all microorganisms having a size of 2 microns and larger can theoretically be separated from the citrus juice at an effluent flow rate of 0.025 gpm at 5000 rpm.

A second prototype FC-2 uses tangential portion with a tangential flow angle of 30 degrees. Table 2 shows the data for this design. The effluent flow rate is twice that of prototype FC-1.

Because bacteria are very sensitive to variations in fluid temperature, the separators must have an adequate cooling system. This cooling system provides a "good" living environment for the test bacteria. This concern was considered in the design of both prototypes.

Figure 10:
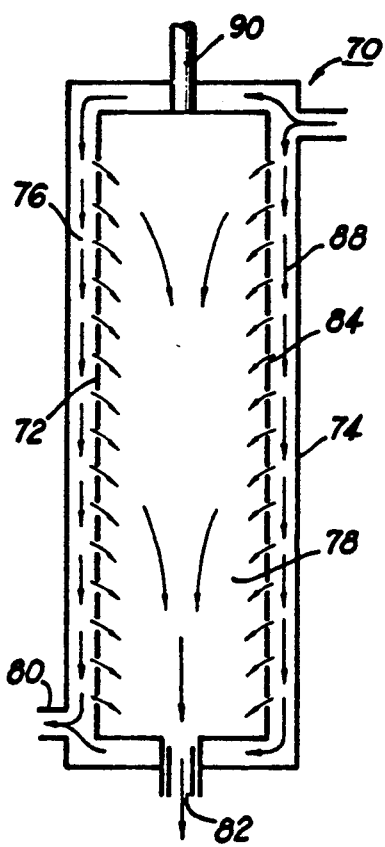
FIG. 10 is a diagrammatic, cross-sectional view of a frontal separator similar to FIG. 1 but with a stationary outer case.
Figure 11A:
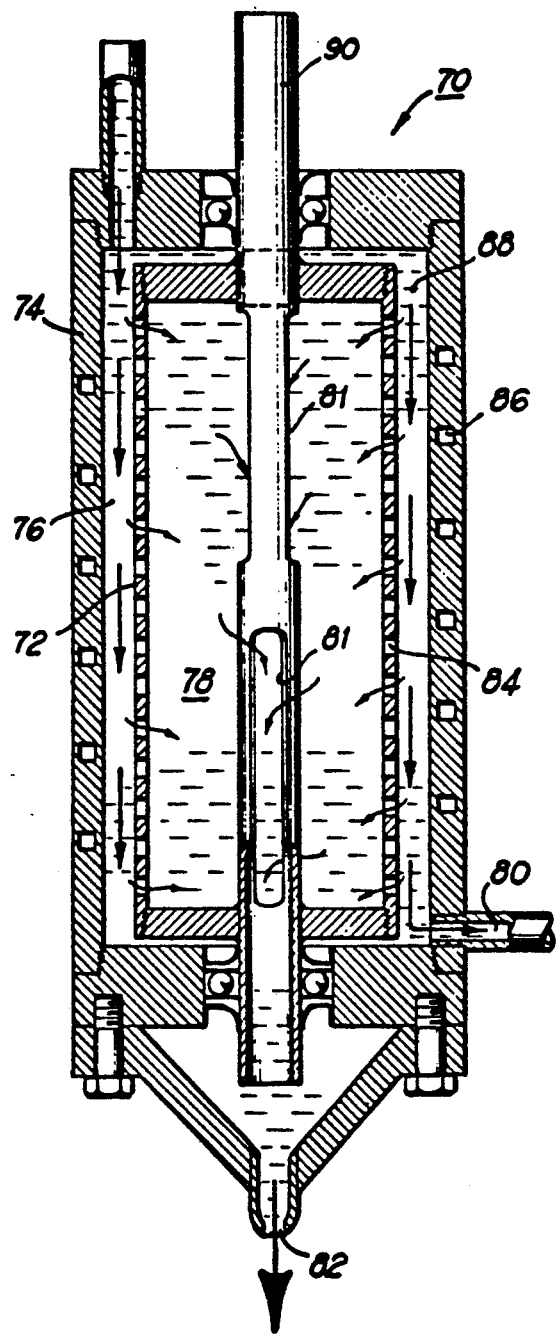
FIG. 11A is a cross-sectional view through a frontal separator as in FIG. 10 having a stationary outer case.

The prototype frontal separator 70 is shown diagrammatically in FIG. 10 and in cross-section in FIG. 11A. This separator includes a rotor 72, a stationary case 74, a separation chamber 76, a clarified liquid outlet chamber 78, a waste outlet

TABLE 1
FRONTAL SEPARATOR DESIGN DATA SHEET

| Particle Parameters | | Rotor Parameters | |
|---|---|---|---|
| * size (μm) | 2.00 | * inner diameter (in) | 4.000 |
| * specific gravity | 1.080 | * outer diameter (in) | 5.000 |
| | | * length (in) | 12.00 |
| Fluid Parameters | | * flow angle (degrees) | 90.00 |
| * specific gravity | 1.043 | * hole porosity (%) | 50.00 |
| * viscosity (cP) | 3.50 | * power (HP) | 13.56 |
| * flow rate (GPM) | 0.025 | * rotational speed (RPM) | 5000.00 |

TABLE 2
FRONTAL SEPARATOR DESIGN DATA SHEET

| Particle Parameters | | Rotor Parameters | |
|---|---|---|---|
| * size (μm) | 2.00 | * inner diameter (in) | 4.000 |
| * specific gravity | 1.080 | * outer diameter (in) | 5.000 |
| | | * length (in) | 12.00 |
| Fluid Parameters | | * flow angle (degrees) | 30.00 |
| * specific gravity | 1.043 | * hole porosity (%) | 50.00 |
| * viscosity (cP) | 3.50 | * power (HP) | 13.56 |
| * flow rate (GPM) | 0.050 | * rotational speed (RPM) | 5000.00 | port 80, an outlet port 82 communicating with the outlet chamber 78 through openings 81 in the shaft 90, openings 84 in the rotor 72, and coolant water passages 86 in the case. In the prototype FC-1 the openings 84 are normal to the rotor surface (see FIG. 11B) and in FC-2 the openings are at an angle to a radius of the rotor 72.

Principle of Operation of the Separators

These prototype frontal separators included a hollow, perforated cylindrical rotor 72 that rotates within a body of liquid 88. This fluid is contained within a stationary outer case, as shown in FIGS. 10 and 11. The frictional drag generated by the motor (not shown) causes the liquid next to the surface of the rotor 72 to rotate. The liquid is pumped to the inlet port of the rotor. If suspended particles more dense than the liquid are present, artificial gravity acts on these particles. This artificial gravity causes the particles to move away from the rotor. Depending on the flow rate, the clean fluid comes out of the outlet port 82 while concentrated contaminated fluid comes out the waste port 80.

The flow rate plays an important role in the efficiency of the separator. The higher the flow rate, the lower the separation efficiency. This situation occurs because the fluid passing near the rotor tends to carry some of the suspended particles into the outlet stream. Consequently, flow rate is a critical parameter in designing the separator.

Design and Component Selection

FIG. 11A is a sectional view of one of the prototype separators. The outer case 74 was made of 6061 grade aluminum to allow for easy machining. The internal diameter of this case is 5 inches. A cooling system integrated into the body of the outer case dissipates any heat that the separator generates while it is operating.

Figure 11B:
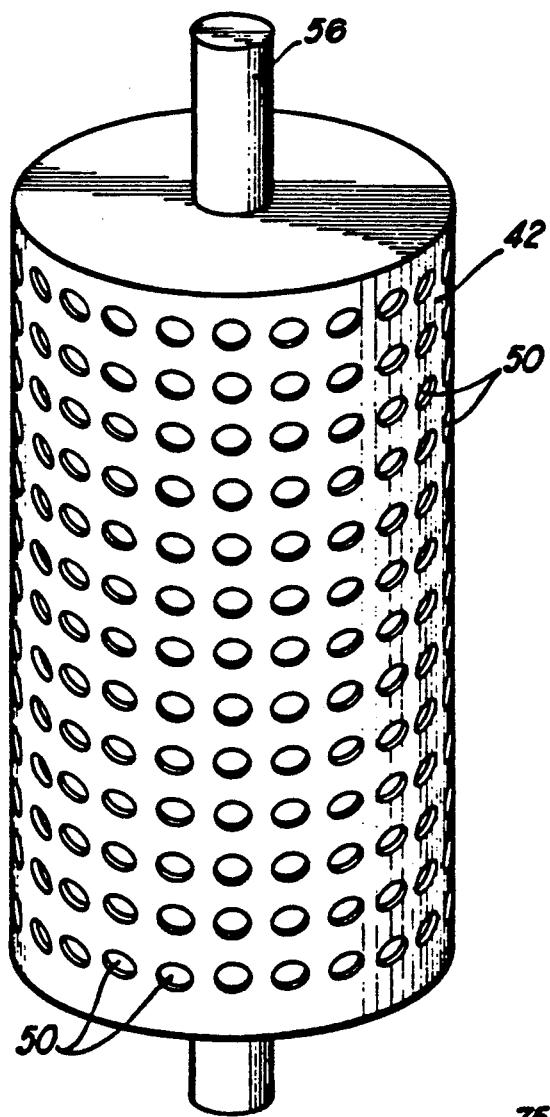
FIG. 11B is a perspective view of one rotor useful in the separator of FIG. 11A.

The rotor 72, which was also constructed of 6061 grade aluminum, has a 4-inch diameter and is attached to a stainless steel center shaft 90. The rotor of the FC-1 prototype was perforated with evenly distributed ¼ inch holes as shown in FIG. 11B. These holes allow clean fluid to pass freely into the center shaft and out the outlet port 82 (see FIG. 11A).

The rotor was mounted in the outer case with high-speed, self-lubricating roller bearings. Conventional high-pressure double face seals seal against the rotating shaft and prevent the fluid from getting into the bearing cavities.

Because the separator unit was only a prototype, the dimensions and operating speed were manipulated to produce a unit that can be easily made and handled. The final dimensions of the separator are detailed in Tables 2 and 3. The separator was designed to operate at its maximum capacity at 5000 rpm. To achieve this speed, the separator was belt-driven through a pulley multiplication system powered by a variable speed hydraulic motor.

Test System

Figure 9:
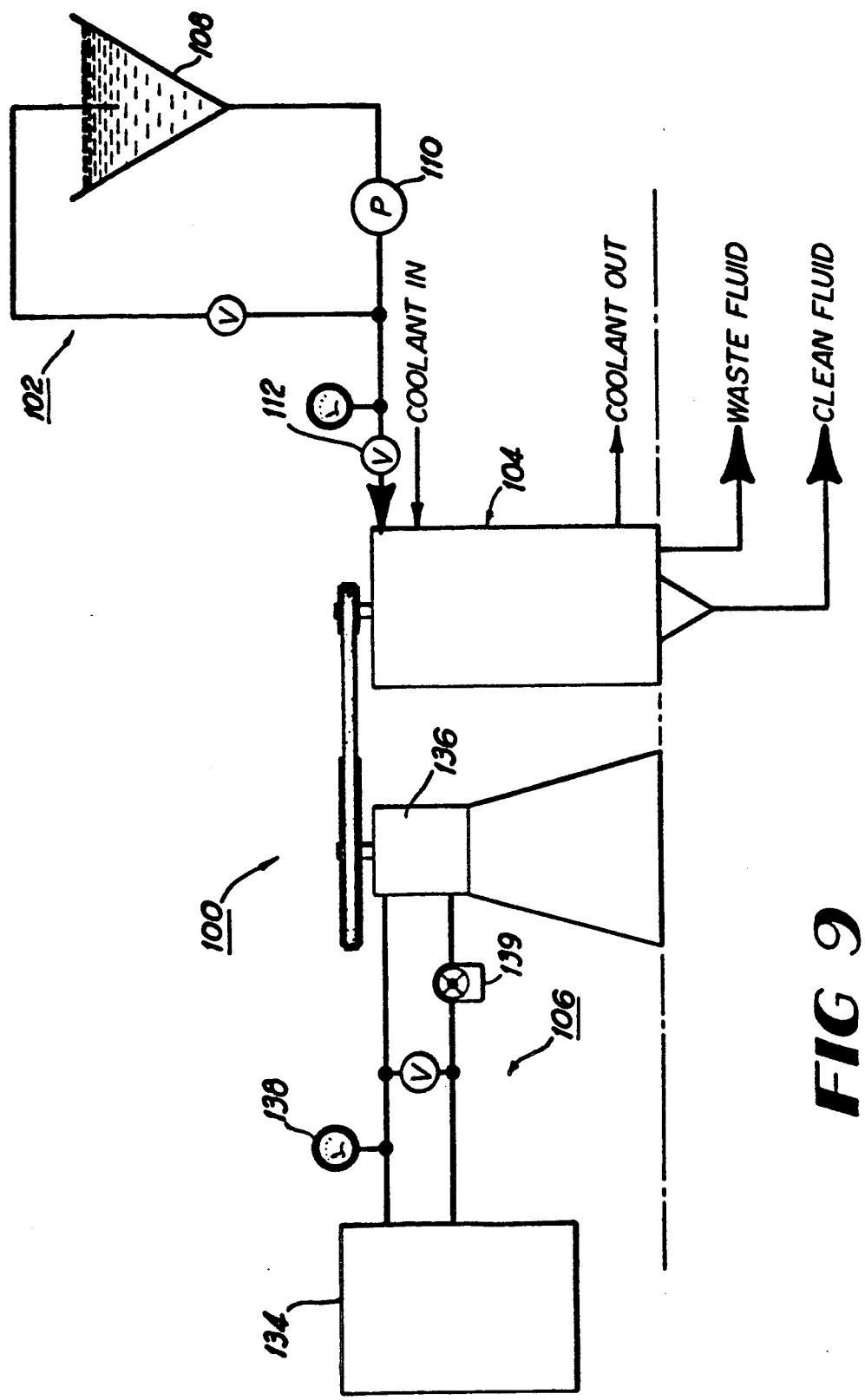
FIG. 9 is a diagrammatic view illustrating a test system for the frontal separator of this invention.

FIG. 9 is a schematic of the test system 100 used to perform all the experiments. This system consists of three sub-systems: a feed system 102, separator system 104, and power drive system 106.

Feed System: The feed system consists of a reservoir 108, a circulating pump 110, and a shut-off valve 112. The contaminated fluid continuously circulates so it is completely mixed before it enters the separator.

Separator System: The separator system 104 consists of the outer case and rotor assembly, integrated cooling system, inlet and outlet ports with sample valves, and a rotor shaft 130 connected to a V-belt drive system 132.

Power Drive System: The power drive system 106 mainly consists of a variable speed power unit 134 that drives the hydraulic motor 136. A flow meter 138, pressure transducer, and flow control valves are used for calculating horse power.

Test Procedure

The test system 100 is completely flushed with clean water and 150 ppm of bleach to insure that it is sanitary. The system is then flushed several times with clean water to remove any traces of chloride. The reservoir 108 is filled with test fluid. A specified amount of particles are injected into the reservoir and circulated for 10-15 minutes to insure complete mixing. The sample is extracted from the reservoir to determine the background, or field concentration level. The rotor speed is adjusted to 5000 rpm and the suspension fluid is injected into the separator. A speed of 5000 rpm must be maintained during the filling of the separator or the speed will decrease. Samples from the outlet port and the waste port are collected and analyzed. The separation efficiency is determined according to the following equation:

$$E = \left(1 - \frac{1}{(N\mu/Nd)}\right) \times 100\%$$

where
E = separation efficiency
Nµ = number of particles at the inlet port of the separator
Nd = number of particles at the outlet port of the separator.

Test Results

Several preliminary tests were conducted using polystyrene latex particles of known size as the contaminant. Water was used as the test fluid. Polystyrene particles were used because they have slightly higher density than the test fluid, which simulates the R. rubra density which is the contaminant to be separated in a preferred embodiment of this invention.

The tests with polystyrene were conducted using two different sizes, 5 and 2 microns. The perforated rotor with 150 micron screen affixed internally was used for the initial experiments. The rotation speed was 5000 rpm. The test results showed that the separation efficiency was very low, ranging from 50 to 75 percent at output flow rates ranging from 25 to 100 mL/min. Higher efficiency, above 90 percent was obtained at lower flow rates.

Despite the results of the preliminary tests, two tests were conducted using R. rubra as the suspended contaminant. One test was conducted using water as the test fluid and the second test was conducted using apple juice. Samples were collected from upstream and downstream of the separator unit. Five ml of fluid was extracted from each sample and plated. The colonies were counted after the plates were incubated for a period of 48 hours. The results from the water run showed very few colonies exist in the downstream samples. On the other hand, the results from the apple juice run showed some colonies exist in these downstream samples. These results are shown in Table 3. The results from these tests were not satisfactory for the following reasons: (1) Rapid temperature increase of the fluid was encountered during the test which led to the fluctuations in the water run results; and (2) no precise control over the downstream sample flow rate, which may have affected the results.

TABLE 3

TEST RESULTS USING PERFORATED ROTOR

| Sample ID | Water Run | Apple Run |
|---|---|---|
| Upstream | 7.6 × 10⁶ cfu/ml | 1.3 × 10⁶ cfu/ml |
| Downstream | | |
| #1 | 42 cfu/ml | 129 cfu/ml |
| #2 | 0.1 cfu/ml | 130 cfu/ml |
| #3 | 10 cfu/ml | 165 cfu/ml |
| #4 | | 0.3 cfu/ml |

Figure 11C:
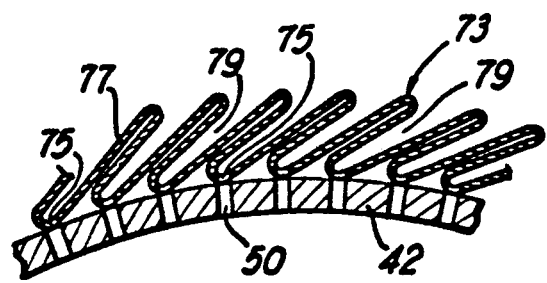
FIG. 11C is a partial perspective view of another rotor useful in the separator of FIG. 11A.

After the results from the first set of experiments it was decided to modify the separator unit. The modification resulted in adding a cooling system to the separator, which was integrated into the outer case. The rotor was also modified as shown in FIG. 11C by affixing a pleated metal sheet 73 to it externally; 0.03125 inch holes 75 were drilled at the internal bends of the pleats 77 to allow fluid to pass through. The pleating approach provided a very small inclined flow passage 79, which resulted in achieving the desired separation at higher flow rates.

After the modification of the rotor was completed, verification tests were conducted using 5 micron polystyrene particles suspended in water. Downstream samples were collected at different flow rates. The results of this experiment are presented in Table 4. These results showed that higher efficiency could be achieved at higher flow rates with the modified rotor. Furthermore, no heat problems were encountered during the test.

TABLE 4

TEST RESULTS USING POLYSTYRENE (5 µm) AT VARIOUS FLOW RATES

| Flow Rate (L/min) | Efficiency % |
|---|---|
| 0.5 | 95 |
| 1.0 | 91.1 |
| 1.5 | 70.94 |

Another set of two experiments were conducted using R. rubra as the contaminant. One run was conducted using water as the test fluid and the second test was conducted with apple juice. Samples were collected downstream and upstream of the separator unit at different flow rates. Portions of the collected samples were plated and the colonies were counted. The results from the water test are shown in Table 5 and from the apple test shown in Table 6. The results indicated that high separation efficiencies at higher flow rates were obtained after the modification of the rotor.

TABLE 5

TEST RESULTS FROM WATER RUN WITH R. RUBRA AT DIFFERENT FLOW RATES

| Sample Flow Rate ml/min | Upstream cfu/ml | Downstream cfu/ml | Separation Efficiency % |
|---|---|---|---|
| 7.1 | 1 × 10⁴ | 82 | 99.18 |
| 20.0 | 1 × 10⁴ | 56 | 99.44 |
| 46.0 | 1 × 10⁴ | 44 | 99.56 |

TABLE 6

TEST RESULTS FROM APPLE RUN WITH R. RUBRA AT DIFFERENT FLOW RATES

| Sample Flow Rate ml/min | Upstream cfu/ml | Downstream cfu/ml | Separation Efficiency % |
|---|---|---|---|
| 11.75 | 9 × 10⁴ | 164 | 99.81 |
| 25.0 | 9 × 10⁴ | 134 | 99.85 |
| 50.0 | 9 × 10⁴ | 124 | 99.86 |

This invention provides a new separation technique different from both normal frontal separation and cross-flow filtration, and which n is a preferred embodiment separates microorganisms from citrus juice. The tangential frontal separation system of this invention, has been experimentally demonstrated to separate Rhodotorula rubra from apple juice. The experimental used a prototype laboratory unit of the separator. The average separator efficiency was 99.62%. This high efficiency verifies the accuracy of the separation theory and of the model obtained.

Tables 7-12 are computer printouts (based on a methematical model) of different frontal separator design data sheets in which various parameter were chosen to see what the effect would be on other parameters. For example, various rotor sizes were chosen to see the affect on flow rate. Also different rotational speeds were chosen to see the affect on flow rates. The difference in power in going from a stationery outer case to a rotating case is dramatic.

TABLE 7
FRONTAL SEPARATOR DESIGN DATA SHEET

| Particle Parameters | | Rotor Parameters | |
|---|---|---|---|
| * size (μm) | 2.00 | * inner diameter (in) | 4.000 |
| * specific gravity | 1.080 | thickness (in) | 0.125 |
| | | sp. weight (g/cm 3) | 2.740 |
| | | * outer diameter (in) | 5.000 |
| | | thickness (in) | 0.125 |
| | | sp. weight (g/cm 3) | 2.740 |
| | | * length (in) | 6.00 |
| | | * flow angle (degrees) | 90.00 |
| Fluid Parameters | | | |
| * specific gravity | 1.043 | * hole porosity (%) | 50.00 |
| * viscosity (cP) | 3.50 | * rotational speed (rpm) | 4500.00 |
| * flow rate (GPM) | 0.010 | | |
| * mixture ratio (S/L) | 0.000 | both rotor and case rotate | |
| | | * start-up power (HP) | 0.01 |
| | | * running power (HP) | 0.01 |
| | | * housing pressure (psi) | 2.51 |
| | | only inner rotor rotates | |
| Power Driver | | * start-up power (HP) | 5.53 |
| * acceleration (rps/sec) | 0.600 | * running power (HP) | 5.53 |
| | | * housing pressure (psi) | 47.27 |

TABLE 8
FRONTAL SEPARATOR DESIGN DATA SHEET

| Particle Parameters | | Rotor Parameters | |
|---|---|---|---|
| * size (μm) | 2.00 | * inner diameter (in) | 10.000 |
| * specific gravity | 1.080 | thickness (in) | 0.125 |
| | | sp. weight (g/cm 3) | 2.740 |
| | | * outer diameter (in) | 11.000 |
| | | thickness (in) | 0.125 |
| | | sp. weight (g/cm 3) | 2.740 |
| | | * length (in) | 12.00 |
| | | * flow angle (degrees) | 90.00 |
| Fluid Parameters | | | |
| * specific gravity | 1.043 | * hole porosity (%) | 50.00 |
| * viscosity (cP) | 3.50 | * rotational speed (rpm) | 3500.00 |
| * flow rate (GPM) | 0.077 | | |
| * mixture ratio (S/L) | 0.000 | both rotor and case rotate | |
| | | * start-up power (HP) | 0.01 |
| | | * running power (HP) | 0.01 |
| | | * housing pressure (psi) | 3.50 |
| | | only inner rotor rotates | |
| Power Driver | | * start-up power (HP) | 157.96 |
| * acceleration (rps/sec) | 0.600 | * running power (HP) | 157.96 |
| | | * housing pressure (psi) | 171.07 |

TABLE 9
FRONTAL SEPARATOR DESIGN DATA SHEET

| Particle Parameters | | Rotor Parameters | |
|---|---|---|---|
| * size (μm) | 2.00 | * inner diameter (in) | 4.000 |
| * specific gravity | 1.080 | thickness (in) | 0.125 |
| | | sp. weight (g/cm 3) | 2.740 |
| | | * outer diameter (in) | 5.000 |
| | | thickness (in) | 0.125 |
| | | sp. weight (g/cm 3) | 2.740 |
| | | * length (in) | 6.00 |
| | | * flow angle (degrees) | 90.00 |
| Fluid Parameters | | | |
| * specific gravity | 1.043 | * hole porosity (%) | 50.00 |
| * viscosity (cP) | 3.50 | * rotational speed (rpm) | 6000.00 |
| * flow rate (GPM) | 0.018 | | |
| * mixture ratio (S/L) | 0.000 | both rotor and case rotate | |
| | | * start-up power (HP) | 0.01 |
| | | * running power (HP) | 0.01 |
| | | * housing pressure (psi) | 4.47 |
| | | only inner rotor rotates | |
| Power Driver | | * start-up power (HP) | 12.21 |
| * acceleration (rps/sec) | 0.600 | * running power (HP) | 12.21 |
| | | * housing pressure (psi) | 84.03 |

TABLE 10
FRONTAL SEPARATOR DESIGN DATA SHEET

| Particle Parameters | | Rotor Parameters | |
|---|---|---|---|
| * size (μm) | 2.00 | * inner diameter (in) | 4.000 |
| * specific gravity | 1.080 | thickness (in) | 0.125 |
| | | sp. weight (g/cm 3) | 2.740 |
| | | * outer diameter (in) | 5.000 |
| | | thickness (in) | 0.125 |
| | | sp. weight (g/cm 3) | 2.740 |
| | | * length (in) | 12.00 |
| | | * flow angle (degrees) | 90.00 |
| Fluid Parameters | | | |
| * specific gravity | 1.043 | * hole porosity (%) | 50.00 |
| * viscosity (cP) | 3.50 | * rotational speed (rpm) | 5000.00 |
| * flow rate (GPM) | 0.025 | | |
| * mixture ratio (S/L) | 0.000 | both rotor and case rotate | |
| | | * start-up power (HP) | 0.05 |
| | | * running power (HP) | 0.03 |
| | | * housing pressure (psi) | 3.10 |
| | | only inner rotor rotates | |
| Power Driver | | * start-up power (HP) | 13.57 |
| * acceleration (rps/sec) | 60.000 | * running power (HP) | 13.56 |
| | | * housing pressure (psi) | 58.36 |

TABLE 11
FRONTAL SEPARATOR DESIGN DATA SHEET

| Particle Parameters | | Rotor Parameters | |
|---|---|---|---|
| * size (μm) | 2.00 | * inner diameter (in) | 35.614 |
| * specific gravity | 1.080 | thickness (in) | 0.125 |
| | | sp. weight (g/cm 3) | 2.740 |
| | | * outer diameter (in) | 36.614 |
| | | thickness (in) | 0.125 |
| | | sp. weight (g/cm 3) | 2.740 |
| | | * length (in) | 12.00 |
| | | * flow angle (degrees) | 90.00 |
| Fluid Parameters | | | |
| * specific gravity | 1.043 | * hole porosity (%) | 50.00 |
| * viscosity (cP) | 3.50 | * rotational speed (rpm) | 5000.00 |
| * flow rate (GPM) | 2.000 | | |
| * mixture ratio (S/L) | 0.000 | both rotor and case rotate | |
| | | * start-up power (HP) | 27.13 |
| | | * running power (HP) | 16.41 |
| | | * housing pressure (psi) | 24.49 |
| | | only inner rotor rotates | |
| Power Driver | | * start-up power (HP) | 49337.75 |
| * acceleration (rps/sec) | 60.000 | * running power (HP) | 49332.61 |
| | | * housing pressure (psi) | 4301.25 |

TABLE 12
FRONTAL SEPARATOR DESIGN DATA SHEET

| Particle Parameters | | Rotor Parameters | |
|---|---|---|---|
| * size (μm) | 2.00 | * inner diameter (in) | 28.558 |
| * specific gravity | 1.080 | thickness (in) | 0.125 |
| | | sp. weight (g/cm 3) | 2.740 |
| | | * outer diameter (in) | 30.000 |
| | | thickness (in) | 0.125 |
| | | sp. weight (g/cm 3) | 2.740 |
| | | * length (in) | 36.00 |
| | | * flow angle (degrees) | 90.00 |
| Fluid Parameters | | | |
| * specific gravity | 1.043 | * hole porosity (%) | 50.00 |
| * viscosity (cP) | 3.50 | * rotational speed (rpm) | 3600.00 |
| * flow rate (GPM) | 2.000 | | |
| * mixture ratio (S/L) | 0.000 | both rotor and case rotate | |
| | | * start-up power (HP) | 39.58 |
| | | * running power (HP) | 27.24 |
| | | * housing pressure (psi) | 14.85 |
| | | only inner rotor rotates | |
| Power Driver | | * start-up power (HP) | 21824.06 |
| * acceleration (rps/sec) | 60.000 | * running power (HP) | 21818.35 |
| | | * housing pressure (psi) | 1447.87 |

While the preferred embodiment of this invention has been described above in detail, it is to be understood that variations and modifications can be made therein without departing from the spirit and scope of the present invention. For example, the present invention can be used to separate any particles from any fluid or liquid, including any microorganisms from any liquids, particularly any foods such as any juices or beverages.

The term "particles" as used herein includes microorganisms including both plant and animal categories thereof, as well as inanimate particles. The term "beverage liquid" as used herein means any beverage or beverage concentrate including 100% juice, beverages which include a percentage of juice, as well as beverages that have no juice component at all. The present invention can be used with any of these beverage liquids.

What is claimed is:

1. A method for removing microorganisms from orange juice in a frontal separator, the microorganisms having a density greater than that of said orange juice and having a particle diameter size in the range of from about 0.5 to 500 micrometers comprising the steps of:
   (a) feeding said orange juice into an annular separation chamber of said frontal separator between an inner, hollow, rotatable rotor that is perforated to provide openings therethrough enclosing a clarified orange juice outlet chamber and an outer rotatable casing mounted for rotation with said rotor, the diameter of the rotor openings being substantially greater than that of said microorganisms, and said rotor openings being at an angle to a radius of said rotor;
   (b) rotating said rotor and casing;
   (c) controlling the flow rate of said orange juice through said separator and the rotational speed of said rotor so as to prevent said microorganisms from flowing through said rotor openings;
   (d) feeding clarified orange juice out from said outlet chamber; and
   (e) removing said separated microorganisms from said separation chamber.

2. The method as recited in claim 1 wherein said openings are at least 1/10 inch across in at least one direction, wherein said microorganisms have a specific gravity not more than 0.050 greater than that of said orange juice, and wherein said rotating step comprises rotating said rotor and casing at a speed of at least 3500 r.p.m.

3. The method as recited in claim 1 including controlling the orange juice flow rate through said separator such that with a particular ratio of solid area to opening area on the outer surface of said rotor, a golfing effect is achieved whereby said microorganisms can not pass through said rotor openings.

4. A method for producing a sample of orange juice with a concentrated quantity of microorganisms therein, in a frontal separator, the microorganisms having a density greater than that of said orange juice and having a particle diameter size in the range of from about 0.5 to 500 micrometers comprising the steps of:
   (a) feeding said orange juice into an annular separation chamber of said frontal separator between an inner, hollow rotatable rotor that is perforated to provide openings therethrough, said rotor enclosing a clarified orange juice outlet chamber and an outer rotatable casing mounted for rotation with said rotor, the diameter of the rotor openings being substantially greater than that of said microorganisms, and said rotor openings being at an angle to a radius of said rotor;
   (b) rotating said rotor and casing;
   (c) controlling the flow rate of said orange juice through said separator and the rotational speed of said rotor so as to prevent said microorganism from flowing through said rotor openings;
   (d) feeding clarified orange juice out from said outlet chamber; and
   (e) removing a sample of orange juice with a concentrated quantity of said microorganisms from said separation chamber.

5. The method as recited in claim 4 wherein said openings are at least 1/10 inch across in at least one direction, wherein said microorganisms have a specific gravity not more than 0.050 greater than that of said orange juice, and wherein said rotating step comprises rotating said rotor and casing at a speed of at least 3500 r.p.m.

6. The method as recited in claim 4 including controlling the orange juice flow rate through said separator such that with a particular ratio of solid area to opening area on the outer surface of said rotor, a golfing effect is achieved whereby said microorganisms can not pass through said rotor openings.

7. A frontal separator for separating microorganisms from orange juice, the microorganisms having a density greater than that of the orange juice and having a particle diameter size in the range of from about 0.5 to 500 micrometers, comprising:
   (a) a hollow, rotatable, cylindrical rotor that is perforated to provide openings therethrough, said rotor having a clarified orange juice outlet chamber therein, said rotor being mounted for rotation inside of an outer rotatable, imperforate casing mounted for rotation with said rotor, said casing being spaced radially from said rotor to provide an annular separation chamber therebetween;
   (b) an orange juice inlet port in liquid communication with said separation chamber for feeding to said frontal separator orange juice having said microorganisms to be separated therefrom;
   (c) an outlet port in liquid communication with said outlet chamber;

(d) means for removing said microorganisms from said separation chamber;
(e) the diameter of said rotor openings being substantially greater than that of said microorganisms;
(f) means for rotating both said rotor and said casing;
(g) means for feeding said orange juice through said separator; and
(h) means for controlling the flow rate of said orange juice through said separator and for controlling the rotational speed of said rotor and casing so as to prevent said microorganisms from flowing through said rotor openings.

8. The apparatus as recited in claim 7 wherein each of said rotor openings has a longitudinal axis that is at an angle to a radius of said rotor.

9. The apparatus as recited in claim 7, wherein said rotor openings are at least ¼ inch across in at least one direction.

10. The apparatus as recited in claim 7 wherein said microorganisms have a specific gravity not more than 0.050 greater than that of said orange juice.

11. The apparatus as recited in claim 7 wherein said rotor has an outer surface and wherein the ratio of solid area to opening area on said outer surface of said rotor is a particular value and including means for controlling the orange juice flow rate through said separator such that with said particular value of the ratio of solid area to opening area on the outer surface of said rotor, a golfing effect is achieved whereby said microorganisms cannot pass through said rotor openings.

12. The apparatus as recited in claim 7 wherein said means for rotating said rotor include means for rotating said rotor and casing at a speed of from about 3500 to 5000 r.p.m.

13. A method for removing particles from a beverage liquid in a frontal separator, the particles having a density greater than that of said beverage liquid and having a particle diameter size in the range of from about 0.5 to 500 micrometers comprising the steps of:
(a) feeding said beverage liquid into an annular separation chamber of said frontal separator between an inner, hollow, rotatable rotor that is perforated to provide openings therethrough enclosing a clarified beverage liquid outlet chamber and an outer rotatable casing mounted for rotation with said rotor, the diameter of the rotor perforations being substantially greater than that of said particles, and said rotor openings being at an angle to a radius of said rotor;
(b) rotating said rotor and casing;
(c) controlling the flow rate of said beverage liquid through said separator and the rotational speed of said rotor so as to prevent said particles from flowing through said rotor openings;
(d) feeding clarified beverage liquid out from said outlet chamber; and
(e) removing said separated particles from said separation chamber.

14. The method as recited in claim 13 wherein said openings are at least 1/10 inch across in at least one direction, wherein said particles have a specific gravity not more than 0.050 greater than that of said beverage liquid, and wherein said rotating step comprises rotating said rotor and casing at a speed of at least 3500 r.p.m.

15. The method as recited in claim 13 including controlling the beverage liquid flow rate through said separator such that with a particular ratio of solid area to opening area on the outer surface of said rotor, a golfing effect is achieved whereby said particles cannot pass through said rotor openings.

16. A method for producing a sample of a beverage liquid with a concentrated quantity of particles therein, in a frontal separator, the particles having a density greater than that of said beverage liquid and having a particle diameter size in the range of from about 0.5 to 500 micrometers comprising the steps of:
(a) feeding said beverage liquid into an annular separation chamber of said frontal separator between an inner, hollow, rotatable rotor that is perforated to provide openings therethrough, said rotor enclosing a clarified beverage liquid outlet chamber and an outer rotatable casing mounted for rotation with said rotor, the diameter of the rotor openings being substantially greater than that of said particles, and said rotor openings being at an angle to a radius of said rotor;
(b) rotating said rotor and casing;
(c) controlling the flow rate of said beverage liquid through said separator and the rotational speed of said rotor so as to prevent said particles from flowing through said rotor openings;
(d) feeding clarified beverage liquid out from said outlet chamber; and
(e) removing said separated particles from said separation chamber.

17. The method as recited in claim 16 wherein beverage liquid is a juice containing beverage, wherein said openings are at least 1/10 inch across in at least one direction, wherein said particles have a specific gravity not more than 0.050 greater than that of said beverage, and wherein said rotating step comprises rotating said rotor and casing at a speed of at least 3500 r.p.m.

18. The method as recited in claim 16 including controlling the beverage liquid flow rate through said separator such that with a particular ratio of solid area to opening area on the outer surface of said rotor, a golfing effect is achieved whereby said particles can not pass through said rotor openings.

19. A method for removing microorganisms from a beverage liquid in a frontal separator, the microorganisms having a density greater than that of said beverage liquid and having a particle diameter size in the range of from about 0.5 to 500 micrometers comprising the steps of:
(a) feeding said beverage liquid into an annular separation chamber of said frontal separator between an inner, hollow, rotatable rotor that is perforated to provide openings therethrough, said rotor enclosing a clarified beverage liquid outlet chamber and an outer casing mounted for rotation with said rotor, the diameter of the rotor openings being substantially greater than that of said microorganisms, and said rotor openings being at an angle to a radius of said rotor;
(b) rotating said rotor;
(c) controlling the flow rate of said beverage liquid through said separator and the rotational speed of said rotor so as to prevent said microorganisms from flowing through said rotor openings;
(d) feeding clarified beverage out from said outlet chamber; and
(e) removing said separated microorganisms from said separation chamber.

20. The method as recited in claim 19 including controlling the beverage liquid flow rate through said separator such that with a particular ratio of solid area to opening area on the outer surface of said rotor, a golfing effect is achieved whereby said microorganisms cannot pass through said rotor openings.

21. A frontal separator for separating microorganisms from a beverage liquid, the microorganisms having a density greater than that of the beverage liquid and having a particle diameter size in the range of from about 0.5 to 500 micrometers, comprising:
  (a) a hollow, rotatable, cylindrical rotor that is perforated to provide openings therethrough, said rotor having a clarified beverage liquid outlet chamber therein, said rotor being mounted for rotation inside of an outer rotatable, imperforate casing mounted for rotation with said rotor, said casing being spaced radially from said rotor to provide an annular separation chamber therebetween;
  (b) a beverage liquid inlet port in liquid communication with said separation chamber for feeding to said frontal separation a beverage liquid having said microorganisms to be separated therefrom;
  (c) an outlet port in liquid communication with said outlet chamber;
  (d) means for removing said microorganisms from said separation chamber;
  (e) the diameter of said rotor openings being substantially greater than that of said microorganisms;
  (f) means for rotating both said rotor and said casing;
  (g) means for feeding said beverage liquid through said separator; and
  (h) means for controlling the flow rate of said beverage liquid through said separator and for controlling the rotational speed of said rotor and casing so as to prevent said microorganisms from flowing through said rotor openings.

22. The apparatus as recited in claim 21 wherein each of said rotor openings has a longitudinal axis that is at an angle to a radius of said rotor.

23. The apparatus as recited in claim 21 wherein said rotor openings are at least ¼ inch across in at least one direction.

24. The apparatus as recited in claim 21 wherein said microorganisms have a specific gravity not more than 0.050 greater than that of said beverage liquid.

25. The apparatus as recited in claim 21 wherein said rotor has an outer surface and wherein the ratio of solid area to opening area on said outer surface of said rotor is a particular value and including means for controlling the beverage liquid flow rate through said separator such that with said particular value of the ratio of solid area to opening area on the outer surface of said rotor, a golfing effect is achieved whereby said microorganisms cannot pass through said rotor openings.

26. The apparatus as recited in claim 21 wherein said means for rotating said rotor include means for rotating said rotor and casing at a speed of from about 3500 to 5000 r.p.m.

* * * * *